US010500734B1

(12) United States Patent
Xiong et al.

(10) Patent No.: US 10,500,734 B1
(45) Date of Patent: Dec. 10, 2019

(54) SERVO ASSEMBLY, ROBOT JOINT AND ROBOT

(71) Applicant: UBTECH Robotics Corp, Shenzhen (CN)

(72) Inventors: Youjun Xiong, Shenzhen (CN); Youpeng Li, Shenzhen (CN); Hongyu Ding, Shenzhen (CN); Wenhua Fan, Shenzhen (CN); Jianxin Pang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/226,663

(22) Filed: Dec. 20, 2018

(30) Foreign Application Priority Data

Oct. 31, 2018 (CN) .......................... 2018 1 1291351

(51) Int. Cl.
*B25J 13/08* (2006.01)
*B25J 17/00* (2006.01)
*B25J 9/10* (2006.01)

(52) U.S. Cl.
CPC ............. *B25J 13/088* (2013.01); *B25J 9/108* (2013.01); *B25J 9/1025* (2013.01); *B25J 17/00* (2013.01)

(58) Field of Classification Search
CPC ........ G05B 11/01; G05B 13/00; G05B 19/19; G05B 19/04; G05B 19/33; B25J 9/18; B25J 5/00; B25J 19/02; B25J 15/02; B60L 11/18; H02K 7/10; H02K 7/14; H02P 1/00; H02P 1/16; H02P 1/163; H02P 1/26; H02P 1/46; H02P 1/465; H02P 3/00; H02P 6/00; H02P 6/002; H02P 6/008; H02P 6/14; H02P 21/06; H02P 21/12; H02P 23/00; H02P 25/00; H02P 25/021; H02P 25/08; H02P 25/14; H02P 27/00; H02P 27/04; H02P 27/06; H02P 29/0066; A61F 5/01
USPC ..... 318/8, 12, 15, 560, 561, 568.11, 568.12, 318/568.16, 568.2, 568.21, 578, 400.01, 318/700, 701, 727, 799, 430, 432; 901/1, 901/8, 14, 15, 19, 23
See application file for complete search history.

(56) References Cited

U.S. PATENT DOCUMENTS

| 5,293,107 | A * | 3/1994 | Akeel | B25J 9/08 310/83 |
| 8,435,309 | B2 * | 5/2013 | Gilbert | A61F 2/582 623/24 |
| 9,077,228 | B2 * | 7/2015 | Tanioka | B25J 17/0241 |
| 9,321,172 | B2 * | 4/2016 | Johnson | B25J 9/08 |
| 9,526,635 | B2 * | 12/2016 | Gilbert | A61F 2/582 |
| 10,369,016 | B2 * | 8/2019 | Lipsey | A61F 2/68 |

(Continued)

*Primary Examiner* — Antony M Paul (57) ABSTRACT

A servo includes a casing, a motor assembly arranged within the casing and including a hollow output shaft, a harmonic drive including a flex spline, a wave generator arranged and a circular spline that comprises, a first bearing to rotatably connect the flex spline to the circular spline so as to enable one of the flex spline and the circular spline to serve as an output member, and enable the other one to serve as a fixed member, a post fixed to the output member and received in the output shaft, a first source member arranged at one end of the post that is away from the output member; and a control circuit board having a first sensing member. The first sensing member and the first source member corporately constitute a rotation sensor to detect rotation of the output member.

17 Claims, 5 Drawing Sheets

(56) References Cited

U.S. PATENT DOCUMENTS

| | | | |
|---|---|---|---|
| 2008/0288088 A1* | 11/2008 | Langenfeld | A61F 2/54 623/57 |
| 2011/0067517 A1* | 3/2011 | Ihrke | B25J 9/126 74/490.03 |
| 2015/0051528 A1* | 2/2015 | Gilbert | A61F 5/01 602/16 |

* cited by examiner

SERVO ASSEMBLY, ROBOT JOINT AND ROBOT

CROSS REFERENCE TO RELATED APPLICATIONS

This application claims priority to Chinese Patent Application No. 201811291351.7, filed Oct. 31, 2018, which is hereby incorporated by reference herein as if set forth in its entirety.

BACKGROUND

1. Technical Field

The present disclosure generally relates to servos, and particularly to a servo with compact structure and a robot including the servo.

2. Description of Related Art

A servo is a key component of some robots and usually includes components such as a housing, a motor, a speed reducer, and the like. In some conventional servos, the motor is arranged within the servo housing, with its output shaft engaged with the reducer through a spline and a gear. One problem with such configuration is that the servo is large, which is not conducive to the miniaturization of the robots.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 1:
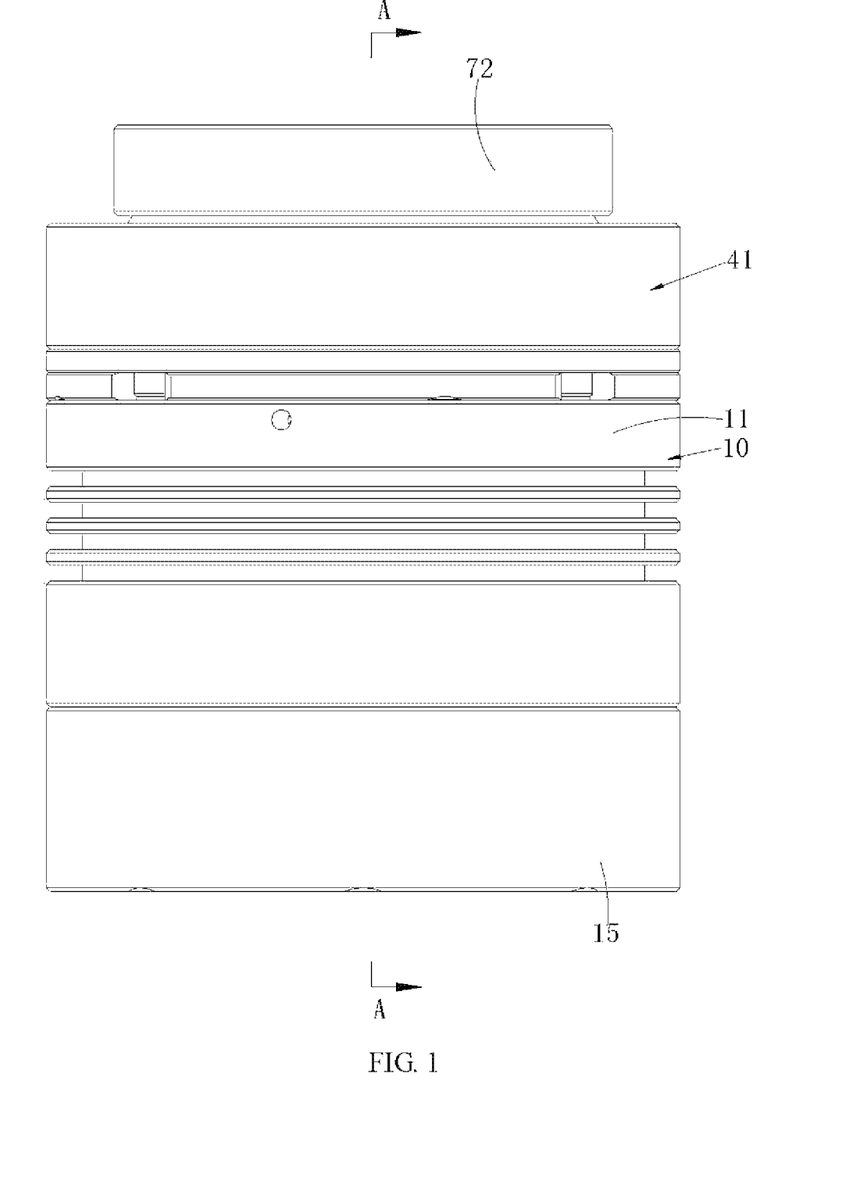
FIG. 1 is a front planar view of a servo according to a first embodiment.
Figure 2:
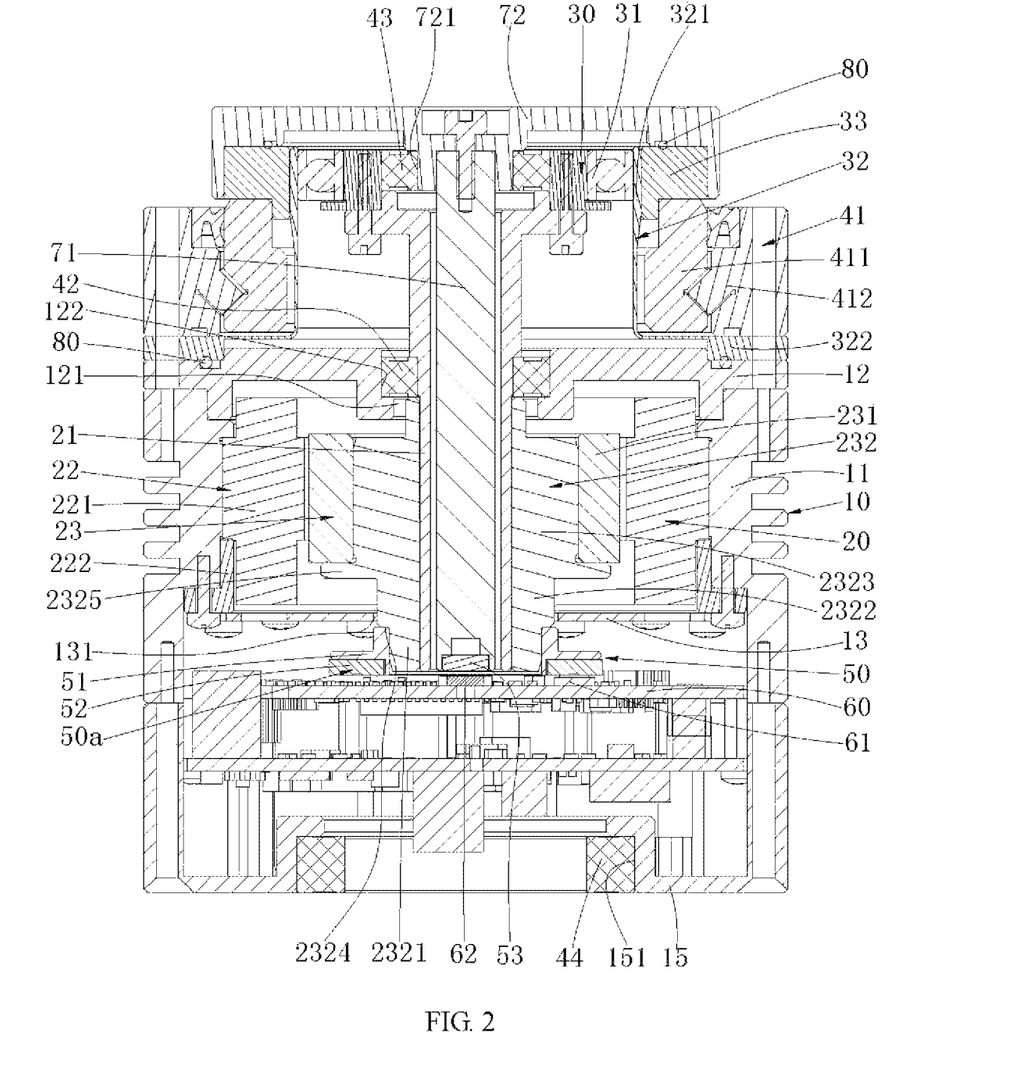
FIG. 2 is a planar cross-sectional view of the servo of FIG. 1 taken along line A-A of FIG. 1.

Referring to FIGS. 1-2, in one embodiment, a servo includes a casing 10, a motor assembly 20, a harmonic drive 30, a first bearing 41, a post 71, a first source member 50 and a control circuit board 60. The motor assembly 20 is arranged within the casing 10 and includes a hollow output shaft 21 extending within the casing 10. The harmonic drive 30 includes a wave generator 31 arranged at one end of the output shaft 21, a flex spline 32 and a circular spline 33 that includes an inner ring gear. The flex spline 32 includes a hollow cylindrical member 321 and an annular portion 322 connected to one end of the cylindrical member 321. The cylindrical member 321 is arranged around the wave generator 31 and includes an outer ring gear on an outer lateral surface thereof, which is engaged with the inner ring gear. The first bearing is used to rotatably connect the flex spline 32 to the circular spline 33 so as to enable one of the flex spline 32 and the circular spline 33 to serve as an output member, and enable the other one to serve as a fixed member. In the embodiment shown in FIGS. 1-2, the flex spline 32 serves as the fixed member and the circular spline 33 serves as the output member. In the embodiment shown in FIGS. 4-5, the circular spline 33 serves as the fixed member and the flex spline 32 serves as the output member.

During operation, the output shaft 21 drives the wave generator 31 to rotate at a high speed. The wave generator 31 then causes the flex spline 32 to elastically deform, and the flex spline 32 is then engaged with the circular spline. Power is then outputted through the output member that rotates at a low speed. With such configuration, the servo is compact, which is conducive to compactness and lightweightness of a robot including the servo.

The wave generator 31 is a cam having a varying radial length, and a rolling bearing is arranged around the cam. The rotation of the wave generator 31 causes elastic deformation of the flex spline 32.

The first bearing 41 is a crossed roller bearing in which the inner ring is divided and the outer ring is rotated. The rigidity of the first bearing 41 is large and the bearing clearance can be adjusted, which is suitable for high-precision rotary motion.

The post 71 is fixed to and coaxial with the output member. The post 71 has a diameter less than the inner diameter of the output shaft 21 so that it can be received within the output shaft 21.

The first source member 50 is arranged at one end of the post 71 that is away from the output member. The control circuit board 60 arranged within the casing 10 under the end of the post 71 that includes the first source member 50. The control circuit board 60 includes a first sensing member 62. The first sensing member 62 and the first source member 50 corporately constitute a first rotation sensor that is used to detect a rotation angle of the output member.

Referring to FIG. 2, in one embodiment, the motor assembly 20 includes a stator assembly 22 and a rotor assembly 23. The stator assembly 22 includes a stator 221 arranged in the casing 10 and a retaining ring 222 for fixing the stator 221 to the casing 10. Coils are wound around the stator 221 and generate a changing magnetic field when energized. The retaining ring 222 is arranged within the casing 10 away from the harmonic drive 30. The retaining ring 222 is fixed to the casing 10 by fasteners, and is easy to assemble.

Figure 3:
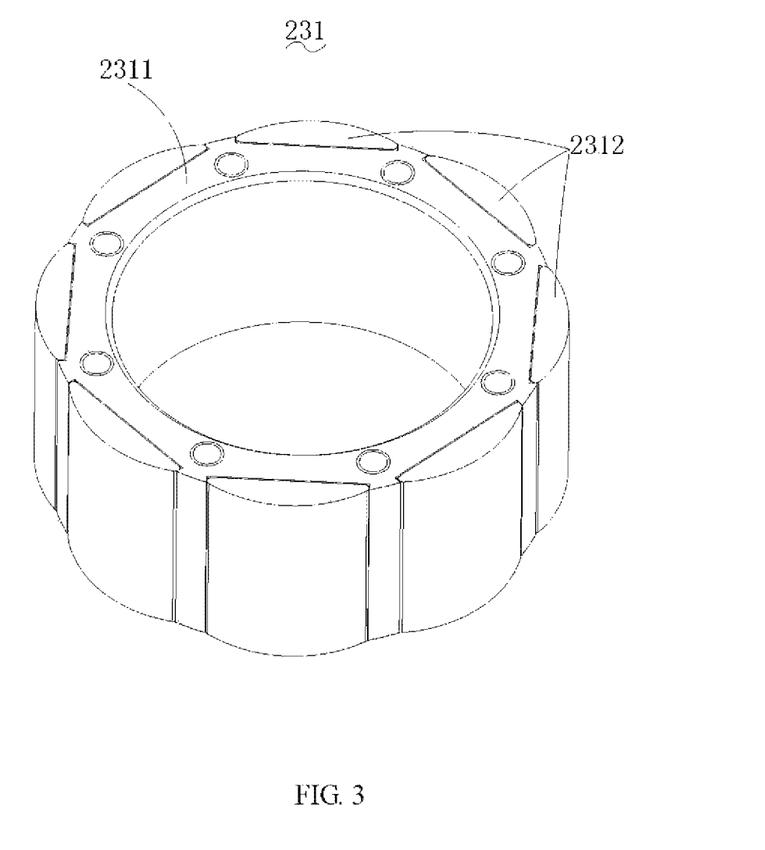
FIG. 3 is an isometric view of the rotor of the motor of FIG. 1.

Referring to FIG. 3, the rotor assembly 23 includes a rotor 231 received in the stator 221 and fixed to the output shaft 21. The rotor 231 includes a rotor core 2311 and a number of magnets 2312 evenly fixed to an outer surface of the rotor core 2311. The rotor 231 is a hollow cylinder. The rotor core 2311 defines a number of recesses in the outer surface thereof so as to respectively receive the magnets 2312.

Referring back to FIG. 2, in one embodiment, the rotor assembly 23 further includes a connection member 232 used to connect the rotor core 2311 to the output shaft 21. The connection member 232 is hollow and arranged around the output shaft 21. The connection member 232 is rotatable together with the output shaft 21. The connection member 232 extends through the retaining ring 222 and is easy to assemble. The connection member 232 includes a stopper member 2325 that is used to prevent the axial movement of the rotor 321.

Figure 5:
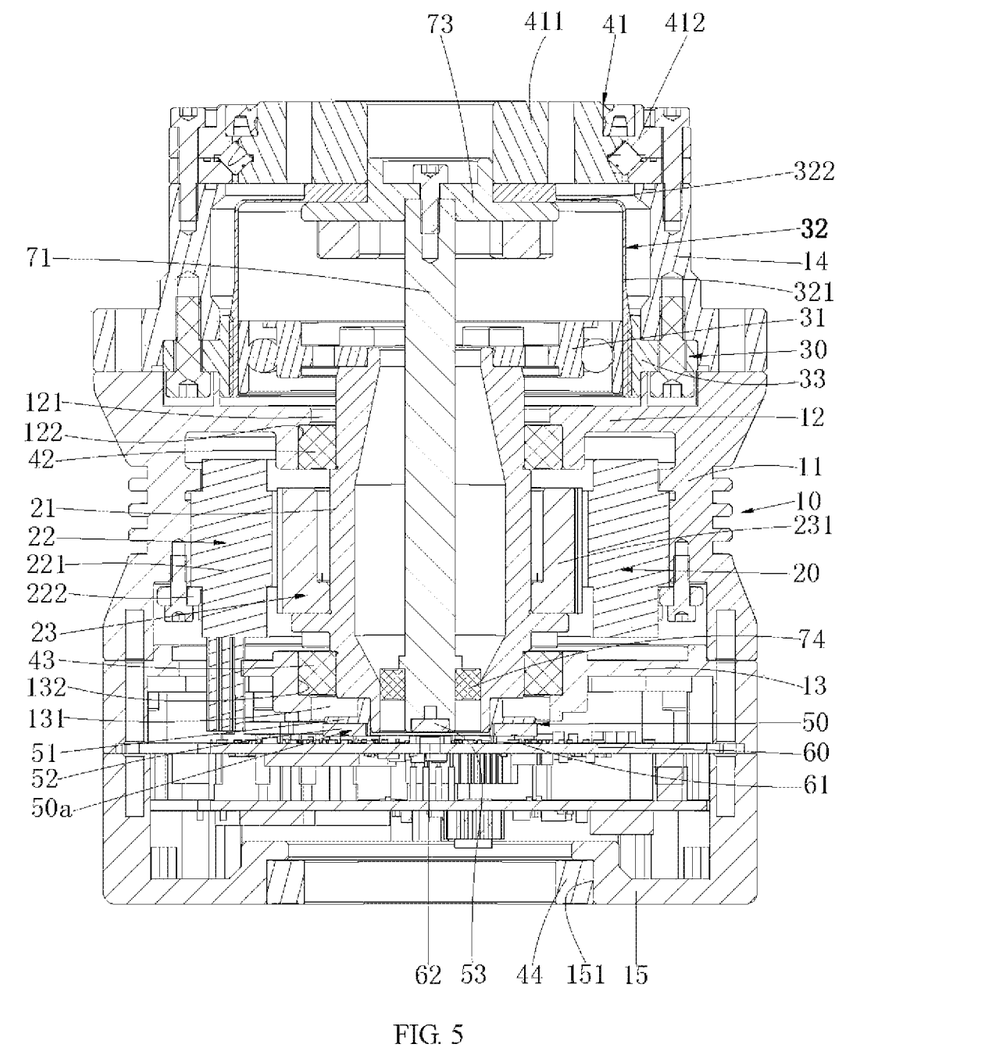
FIG. 5 is a planar cross-sectional view of the servo of FIG. 1 taken along line B-B of FIG. 4.

Referring to FIGS. 2 and 5, in one embodiment, the first source member 50 is a magnet 53. The first sensing member 62 is used to detect a change of magnetic field caused by rotation of the first source member 50. The rotation angle of the output member can be calculated based on the output of the first sensing member 62, which is known and will not be described in detail here.

Referring to FIGS. 2 and 5, in one embodiment, the servo further includes a second source member 50a and a second sensing member 61. The second source member 50a is arranged on an end of the output shaft 21 that is away from the output member. The second sensing member 61 is arranged on the control circuit board 60. The second sensing member 61 and the second source member 50a corporately constitute a second rotation sensor that is used to detect the rotation angle of the output shaft 21. The current in the coil of the stator 221 can thus be adjusted accordingly to drive the rotor 231 to keep rotating.

Referring to FIGS. 2 and 5, in one embodiment, the second source member 50a includes a holder 51 fixed to an end of the output shaft 21 that is away from the harmonic drive 30 and a magnet 52 fixed to the holder 51. The control circuit board 60 is spaced apart from the magnet 52. The second sensing member 61 is used to detect a change of magnetic field caused by rotation of magnet 52. The control circuit board 60 is electrically connected to the coils of the stator 221. After the servo is energized, the stator 221 generates a changing magnetic field, and the rotor 231 is rotated by the force generated by the changing magnetic field and drives the output shaft 21 to rotate synchronously. The current in the coils of the stator 221 can be adjusted based on the detected rotation angle of the output shaft 21 to drive the rotor 231 to keep rotating. It should be noted that the first rotation sensor and the second rotation sensor can be replaced with other types of sensors for detecting the angle of rotation, such as a grating encoder, an inductive encoder and the like. For the grating encoder, the code disc is fixed on the output shaft of the motor, a number of slots are arranged circumferentially in the code disc, and the signal transceiver device is mounted on the control circuit board. A light emitter and two light sensors are arranged at opposite sides of the code disc. The light of the light emitter passes through a lens and a slot of the code disc and is received by the two light sensors. After signal processing, the rotation angle of the output shaft of the motor is calculated. The second magnet 52 is arranged adjacent to the first magnet 53. The second magnet 52 and the first magnet 53 respectively oppose the second sensing member 61 and the first sensing member 62 of the control circuit board 60. The control circuit and an encoder circuit are integrated into one piece to realize angle detection and the overall structure is compact.

Referring back to FIG. 2, the connection member 232 includes a first portion 2321, a second portion 2322 connected to an axial end of the first portion 2321 and third portion 2323 connected to an axial end of the second portion 2322 which is away from the first portion 2321. The holder 51 is fixed to the first portion 2321. The second portion 2322 extends through the retaining ring 222. The rotor 231 is arranged round the third portion 2323. A shoulder 2324 is formed between the first portion 2321 and the second portion 2322. The shoulder 2324 is used to prevent the axial movement of the holder 51. The stopper member 2325 is formed between the second portion 2322 and the third portion 2323 to prevent the axial movement of the rotor 231. The connection member of such structure is easy to shape and facilitates assembly of related components.

Referring to FIGS. 2 and 5, in one embodiment, the casing 10 includes a hollow main body 11, a first cap 12 connected to one end of the main body 11 and a second cap 13 that is connected to the main body 11 and opposite the first cap 11. The first cap 12 defines a first through hole 121, the second cap 13 defines a second through hole 131, and the output shaft 21 extends through the first through hole 121 and the second through hole 131. The first cap 12 can be detachably connected to or integrally formed with the main body 11. The first cap 12 and the second cap 13 form a space to receive the motor assembly 20. The second cap 13 is fixed to the main body 11 by fasteners. In order to facilitate the assembling, the second cap 13 may be of a number of annular structures or an annular shape.

Referring back to FIGS. 1-2, in one embodiment, when the flex spline 32 serves the fixed member and the circular spline 33 serves as the output member, the annular portion 322 is fixed to the casing 10, the first bearing 41 has an inner ring 411 fixed to the circular spline 33 and an outer ring 412 fixed to the annular portion 322. Power is then outputted through the circular spline 33 that rotates at a low speed.

Referring back to FIGS. 1-2, in one embodiment, when the flex spline 32 serves the fixed member and the circular spline 33 serves as the output member, the circular spline 33 is fixed to an output plate 72. An end (i.e. top end in FIG. 2) of the post 72 is fixed to an inner side of the output plate 72. Power is then outputted through the output plate 72. The post 71 is fixed to the output plate 72 by fasteners and cantilevered.

Referring back to FIG. 2, in one embodiment, when the flex spline 32 serves the fixed member and the circular spline 33 serves as the output member, a second bearing 42 is fit in the first through hole 121 of the first cap 12 for supporting the output shaft 21. A third bearing 43 is connected to the output plate 72 for supporting the harmonic drive 31. With such configuration, the output shaft 21 is supported in the casing 10, which can reduce the friction between the output shaft 21 and the outside and improve efficiency. The first through hole 121 is a stepped hole that includes a larger hole 122 where the second bearing 42 is received. The output shaft includes a stopper portion for preventing an axial movement of the second bearing 42. One end (i.e. top end in FIG. 2) of the connection member 232 abuts against the lower end of the second bearing 42. The output plate 72 includes a protruding portion 721 around which the third bearing 43 is arranged. The wave generator 31 is mounted on the third bearing 43.

In one embodiment, a height of the third bearing 43 is less than a height of the wave generator 31. The third bearing 43 is located completely inside the wave generator 31, which can allow the servo to have smaller axial length and is thus conducive to structure compactness. One end (i.e. top end in FIG. 2) of the output shaft 21 extends out of the casing 10. The wave generator 31 is fixed to the end of the output shaft that extends out of the casing 10. Such configuration facilitates the assembling of the harmonic drive 30.

The annular portion 322 extends radially outwardly from an end (i.e. lower end in FIG. 2) of the cylindrical member 321. The first bearing 41 is arranged around the cylindrical member 321. The annular portion 322 is fixed to the first cap 12. The outer ring 412 of the first bearing 41 and the annular portion 322 of the flex spline 32 are fixedly coupled to the casing 10 by fasteners, which facilitates assembly.

The harmonic drive 30 is arranged between the first cap 12 and the output plate 72. The top end of the output shaft 21 has a mounting plate that is fixed to the wave generator 31 by fasteners.

A washer 80 is arranged between the output plate 72 and the circular spline 33, and a washer 80 is arranged between the annular portion 322 of the flex spline 32 and the first cap 12. Washers 80 can improve the tightness of the harmonic drive 30.

Figure 4:
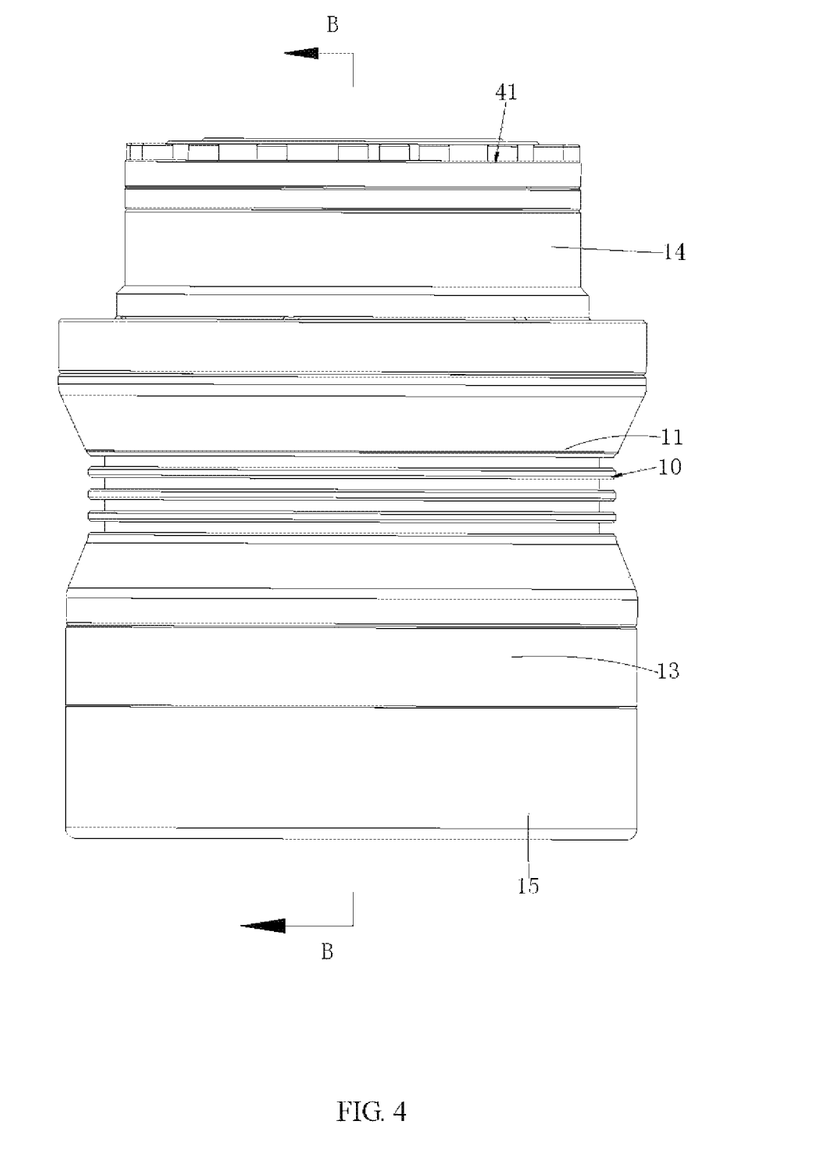
FIG. 4 is a front planar view of a servo according to a second embodiment.

Referring to FIGS. 4-5, in one embodiment, when the circular spline 33 serves the fixed member and the flex spline 32 serves as the output member, the circular spline 33 is indirectly fixed to the casing 10, and the inner ring 411 of the first bearing 41 is fixed to the annular portion 322 and the outer ring 412 is fixed to the casing 10. Power is then outputted through the flex spline 32 that rotates at a low speed. In the embodiment, the servo further includes an upper housing 14 fixed to the casing 10 by screws and the circular spline 33 is fixed to the upper housing 14.

In one embodiment, the servo further includes a fixing plate 73 where the annular portion 322 is fixed. The top end of the post 71 is fixed to the fixing plate 73. The annular portion 322 is indirectly fixed to post 71. The fixing plate 73 is fixed to the inner ring 411 of the first bearing 41 by fasteners.

In one embodiment, a support bearing 74 is arranged within the output shalt 21 for supporting the output shaft 21 at a position adjacent to the lower end of the output shaft 21. Opposite ends of the post 71 are both supported, which enables the post 71 to rotate stably during operation of the servo, thereby reducing the angle detection error caused by the swing of the post 71.

Referring to FIG. 5, in one embodiment, when the circular spline 33 serves the fixed member and the flex spline 32 serves as the output member, a second bearing 42 is received in the first through hole 121 of the first cap 12 and a third bearing 43 is received in the second through hole 131 of second cap 13, both of which are used to support the output shaft 21. With such configuration, the output shaft 21 is supported in the casing 10, which can reduce the friction between the output shaft 21 and the outside and improve efficiency. The first through hole 121 is a stepped hole that includes a larger hole 122 where the second bearing 42 is received. The output shaft 21 includes a stopper portion for preventing an axial movement of the second bearing 42. The second through hole 131 is a stepped hole that includes a larger hole 132 where the third bearing 43 is received. The output shaft 21 includes a stopper portion for preventing an axial movement of the third bearing 43.

The harmonic drive 30 is arranged within the upper housing 14. In the embodiment, the annular portion 322 extends radially inwardly from an end (i.e. top end in FIG. 5) of the cylindrical member 321. The first bearing 41 is located at an end (i.e. top end in FIG. 5) of the upper housing 14 away from the casing 10. More specifically, the outer ring 412 is fixed to the top end of the upper housing 14. The circular spline 33 is fixed to the lower end of the upper housing 14. Such configuration is easy to assemble, compact in structure and requires less space. The annular portion 322 of the flex spline 32 is fixed to the inner ring 411 of the first bearing 41 and outputs power through the first bearing.

Referring to FIGS. 2 and 5, in one embodiment, the servo further includes a fourth bearing 44. The casing 10 further includes a third cap 15 connected to an end of the main body 11 that is opposite the first cap 12. The third cap 15 defines a receiving space 151 to receive the fourth bearing 44. Such configuration can further facilitate the reduction of the size of the servo. In the example shown in FIG. 2, when the servo is used as a joint between a first component and a second component of a robot, the first component, which preferably has a U-shaped end, can be fixed to the output plate 72 and the inner ring of the fourth bearing 44, and the second component can be fixed to an outer surface of the casing 10. The first component can then rotate, as driven by the output plate 72, with respect to the second component. In the example shown in FIG. 5, the first component, which preferably has a U-shaped end, can be fixed to the inner ring 411 of the first bearing 41 and the inner ring of the fourth bearing 44, and the second component can be fixed to the outer surface of the casing 10. The first component can then rotate, as driven by the inner ring 411 of the first bearing 41, with respect to the second component.

In one embodiment, a robot includes a servo as described above. With the above configuration, the servo is compact, which is conducive to compactness and lightweightness of the robot.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo comprising:
   a casing;
   a motor assembly arranged within the casing, the motor assembly comprising a hollow output shaft extending within the casing;
   a harmonic drive comprising a flex spline, a wave generator arranged at one end of the output shaft and a circular spline that comprises a inner ring gear, the flex spline comprising a hollow cylindrical member and an annular portion connected to one end of the cylindrical member, the cylindrical member being arranged around the wave generator and comprising an outer ring gear on an outer lateral surface thereof, which is engaged with the inner ring gear;
   a first bearing configured to rotatably connect the flex spline to the circular spline so as to enable one of the flex spline and the circular spline to serve as an output member, and enable the other one to serve as a fixed member;
   a post fixed to the output member and received in the output shaft;
   a first source member arranged at one end of the post that is away from the output member; and
   a control circuit board arranged under the end of the post that includes the first source member, the control circuit board comprising a first sensing member, the first sensing member and the first source member corporately constituting a first rotation sensor that is configured to detect rotation of the output member.

2. The servo according to claim 1, wherein the motor assembly comprises a stator assembly and a rotor assembly, the stator assembly comprises a stator arranged within the casing, and a retaining ring for fixing the stator to the casing, the rotor assembly comprises a rotor received in the stator and fixed to the output shaft; the rotor comprises a rotor core and a plurality of magnets evenly fixed to an outer surface of the rotor core.

3. The servo according to claim 2, wherein the rotor assembly further comprises a connection member configured to connect the rotor core to the output shaft.

4. The servo according to claim 1, wherein the first source member is a magnet, and the first sensing member is configured to detect a change of magnetic field caused by rotation of the first source member.

5. The servo according to claim 1, further comprising a second source member and a second sensing member, wherein the second source member is arranged on an end of the output shaft that is away from the output member, the second sensing member is arranged on the control circuit board, the second sensing member and the second source member corporately constituting a second rotation sensor that is configured to detect rotation of the output shaft.

6. The servo according to claim 5, wherein the second source member comprises a holder fixed to an end of the output shaft that is away from the harmonic drive and a magnet fixed to the holder, the control circuit board is spaced apart from the magnet, the second sensing member is configured to detect a change of magnetic field caused by rotation of magnet.

7. The servo according to claim 1, wherein the casing comprises a hollow main body, a first cap connected to one end of the main body and a second cap that is connected to the main body and opposite the first cap, the first cap defines a first through hole, the second cap defines a second through hole, and the output shaft extends through the first through hole and the second through hole.

8. The servo according to claim 7, wherein when the flex spline serves the fixed member and the circular spline serves as the output member, the annular portion is fixed to the casing, the first bearing comprises an inner ring fixed to the circular spline and an outer ring fixed to the annular portion.

9. The servo according to claim 8, further comprising an output plate connected to the circular spline, wherein one end of the post that is opposite the source member is fixed to the output plate.

10. The servo according to claim 9, further comprising a second bearing fit in the first through hole of the first cap for supporting the output shaft, and a third bearing connected to the output plate for supporting the harmonic drive.

11. The servo according to claim 10, wherein a height of the third bearing is less than a height of the wave generator.

12. The servo according to claim 7, wherein when the circular spline serves the fixed member and the flex spline serves as the output member, the circular spline is fixed to the casing, the first bearing comprises an inner ring fixed to the annular portion and an outer ring fixed to the casing.

13. The servo according to claim 12, further comprising a disc member connected to the annular portion, wherein one end of the post that is opposite the source member is fixed to the disc member.

14. The servo according to claim 12, further comprising a support bearing arranged within the output shaft for supporting the post.

15. The servo according to claim 12, further comprising a second bearing received in the first through hole of the first cap and a third bearing received in the second through hole of second cap, both of which are configured to support the output shaft.

16. The servo according to claim 7, further comprising a fourth bearing, wherein the casing further comprises a third cap connected to an end of the main body that is opposite the first cap, the third cap defines a receiving space to receive the fourth bearing.

17. A robot comprising a servo, the servo comprising:
a casing;
a motor assembly arranged within the casing, the motor assembly comprising a hollow output shaft extending within the casing;
a harmonic drive comprising a flex spline, a wave generator arranged at one end of the output shaft and a circular spline that comprises a inner ring gear, the flex spline comprising a hollow cylindrical member and an annular portion connected to one end of the cylindrical member, the cylindrical member being arranged around the wave generator and comprising an outer ring gear on an outer lateral surface thereof, which is engaged with the inner ring gear;
a first bearing configured to rotatably connect the flex spline to the circular spline so as to enable one of the flex spline and the circular spline to serve as an output member, and enable the other one to serve as a fixed member;
a post fixed to the output member and received in the output shaft;
a first source member arranged at one end of the post that is away from the output member; and
a control circuit board arranged under the end of the post that includes the first source member, the control circuit board comprising a first sensing member, the first sensing member and the first source member corporately constituting a first rotation sensor that is configured to detect rotation of the output member.

* * * * *